(12) United States Patent
Sakurai et al.

(10) Patent No.: US 11,794,605 B2
(45) Date of Patent: Oct. 24, 2023

(54) POWER CALCULATION APPARATUS AND POWER CALCULATION METHOD

(71) Applicant: Honda Motor Co., Ltd., Tokyo (JP)

(72) Inventors: Takayuki Sakurai, Wako (JP); Hiroyuki Kanazawa, Wako (JP); Jun Kudo, Wako (JP); Ayano Otogasako, Wako (JP); Thomas Stephen Pontefract, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 17/211,308

(22) Filed: Mar. 24, 2021

(65) Prior Publication Data

US 2021/0300203 A1    Sep. 30, 2021

(30) Foreign Application Priority Data

Mar. 27, 2020   (JP) ................................ 2020-058021

(51) Int. Cl.
*G05D 3/12*    (2006.01)
*G05D 5/00*    (2006.01)
(Continued)

(52) U.S. Cl.
CPC .............. *B60L 55/00* (2019.02); *B60L 53/18* (2019.02); *B60L 53/665* (2019.02); *B60L 58/13* (2019.02);
(Continued)

(58) Field of Classification Search
CPC ........ B60L 55/00; B60L 53/18; B60L 53/665; B60L 58/13; B60L 2240/622; G06Q 10/04; G06Q 30/06; G06Q 50/06; H02J 3/322; H02J 7/0048; H02J 7/0063; H02J 13/00028

See application file for complete search history.

(56) References Cited

U.S. PATENT DOCUMENTS

2008/0052145 A1    2/2008  Kaplan et al.
2010/0079004 A1*   4/2010  Keefe ..................... B60L 53/63
                                                         307/80

(Continued)

FOREIGN PATENT DOCUMENTS

DE    112014002012      1/2016
WO    2015019585 A1     2/2015

OTHER PUBLICATIONS

European Search Report; Application EP21164605; dated Sep. 1, 2021.

*Primary Examiner* — Zhipeng Wang
(74) *Attorney, Agent, or Firm* — Duft & Bornsen, PC

(57) ABSTRACT

A power calculation apparatus predicting and calculating an amount of power suppliable from a vehicle having a battery to a power grid via a connection apparatus, the power calculation apparatus includes a microprocessor and a memory connected to the microprocessor. The microprocessor is configured to perform: predicting a position of the vehicle after a predetermined duration; predicting a degree of likelihood of connection of the vehicle to the connection apparatus after the predetermined duration, based on a predicted position of the vehicle after the predetermined duration and the connection apparatus; and predicting the amount of power suppliable from the vehicle to the power grid after the predetermined duration, based on the degree of likelihood.

9 Claims, 6 Drawing Sheets

(51) Int. Cl.

| | | |
|---|---|---|
| *G05D 9/00* | (2006.01) | |
| *G05D 11/00* | (2006.01) | |
| *G05D 17/00* | (2006.01) | |
| *B60L 55/00* | (2019.01) | |
| *B60L 53/66* | (2019.01) | |
| *B60L 58/13* | (2019.01) | |
| *B60L 53/18* | (2019.01) | |
| *H02J 3/32* | (2006.01) | |
| *H02J 13/00* | (2006.01) | |
| *H02J 7/00* | (2006.01) | |
| *G06Q 10/04* | (2023.01) | |
| *G06Q 30/06* | (2023.01) | |
| *G06Q 40/04* | (2012.01) | |
| *G06Q 50/06* | (2012.01) | |

(52) U.S. Cl.
CPC ........... *G06Q 10/04* (2013.01); *G06Q 30/06* (2013.01); *G06Q 40/04* (2013.01); *G06Q 50/06* (2013.01); *H02J 3/322* (2020.01); *H02J 7/0048* (2020.01); *H02J 7/0063* (2013.01); *H02J 13/00028* (2020.01); *B60L 2240/622* (2013.01)

(56) References Cited

U.S. PATENT DOCUMENTS

| | | | |
|---|---|---|---|
| 2011/0202192 A1 | 8/2011 | Kempton | |
| 2012/0249068 A1* | 10/2012 | Ishida | B60L 55/00 320/109 |
| 2013/0204471 A1 | 8/2013 | O'Connell et al. | |
| 2019/0366831 A1* | 12/2019 | Cafeo | H02J 7/342 |
| 2020/0006954 A1* | 1/2020 | Miyata | H02J 3/322 |
| 2020/0298721 A1* | 9/2020 | Hishida | B60L 53/60 |

* cited by examiner

FIG. 3

| No. | (LATITUDE, LONGITUDE) |
|---|---|
| 1 | $(lat_1, lng_1)$ |
| 2 | $(lat_2, lng_2)$ |
| ⋮ | ⋮ |
|  |  |
| n | $(lat_n, lng_n)$ |
| n+1 | $(lat_{n+1}, lng_{n+1})$ |

FIG. 4

| USER ID | CONNECTION ACHIEVEMENT |
|---|---|
| 1 | 2/2 |
| 2 | 0/5 |
| 3 | 0/0 |
| 4 | 1/3 |
| ⋮ | ⋮ |

POWER CALCULATION APPARATUS AND POWER CALCULATION METHOD

CROSS-REFERENCE TO RELATED APPLICATION

This application is based upon and claims the benefit of priority from Japanese Patent Application No. 2020-058021 filed on Mar. 27, 2020, the content of which is incorporated herein by reference.

BACKGROUND OF THE INVENTION

Field of the Invention

This invention relates to a power calculation apparatus and a power calculation method predicting and calculating an amount of power that may be supplied to a power grid in the future.

Description of the Related Art

As such an apparatus of this type, a conventionally known apparatus calculates the amount of power supplied from factories and various facilities to a power grid (See, for example, WO2015/019585A1).

Meanwhile, in recent years, considered has been allowing battery-mounted vehicles such as electric vehicles (EVs) to participate in a power transaction via a power grid. However, such a vehicle varies in connection position to the power grid due to movement of the vehicle. Thus, in order to allow the vehicle to participate in the power transaction, it is difficult to predict accurately the amount of power for supply from the vehicle to the power grid.

SUMMARY OF THE INVENTION

An aspect of the present invention is a power calculation apparatus predicting and calculating an amount of power suppliable from a vehicle having a battery to a power grid via a connection apparatus. The power calculation apparatus includes a microprocessor and a memory connected to the microprocessor. The microprocessor is configured to perform: predicting a position of the vehicle after a predetermined duration; predicting a degree of likelihood of connection of the vehicle to the connection apparatus after the predetermined duration, based on a predicted position of the vehicle after the predetermined duration and the connection apparatus; and predicting the amount of power suppliable from the vehicle to the power grid after the predetermined duration, based on the degree of likelihood.

Another aspect of the present invention is a power calculation method predicting and calculating an amount of power suppliable from a vehicle having a battery to a power grid via a connection apparatus. The power calculation method includes: predicting a position of the vehicle after a predetermined duration; predicting a degree of likelihood of connection of the vehicle to the connection apparatus after the predetermined duration, based on a predicted position of the vehicle after the predetermined duration and the connection apparatus, and predicting the amount of power suppliable from the vehicle to the power grid after the predetermined duration, based on the degree of likelihood.

BRIEF DESCRIPTION OF THE DRAWINGS

The objects, features, and advantages of the present invention will become clearer from the following description of embodiments in relation to the attached drawings, in which:

FIG. 3 is a diagram showing exemplary position information;

FIG. 4 is a diagram showing exemplary connection-achievement information;

DETAILED DESCRIPTION

An embodiment of the present invention will be described below with reference to FIGS. 1 to 8. A power calculation apparatus according to the embodiment of the present invention is an apparatus provided between a vehicle such as an EV and a power grid, and predicts and calculates the amount of power suppliable to the power grid from a battery mounted on the vehicle. Hereinafter, the power grid may be simply referred to as a grid. In addition, in the following, when simply expressed as a vehicle, the vehicle means an EV Recently, the effective utilization of renewable energy has been promoted due to the increase in greenhouse gas emissions. As one of the effective utilizations, a Vehicle to Grid (V2G) system has been proposed, in which EVs are connected to a power grid and the energy stored in the batteries mounted on the EVs is utilized effectively.

In such a V2G system, the EVs not only receive power supply from the grid to charge the batteries, but also supply the power stored in the batteries to the grid, resulting in making the batteries function as if the batteries were one of the power storage facilities in a commercial power grid. As described above, in the V2G system, not only one-way power supply from the power grid to the EVs, but also two-way power transfer including power supply from the EVs to the power grid are performed.

Meanwhile, the liberalization of energy markets has led to the liberalization of power trading. As a result, a market for power transaction (hereinafter, referred to as a power transaction market) between electric power companies and power producers has been opened. In addition, considered has been central management of power for supply from EVs to the power grid in a Vehicle to Grid (V2G) system to allow the power to be bid in the transaction market.

However, as described above, an EV varies in connection position to the power grid due to movement of the EV. Therefore, with the conventional power calculation method for a fixed battery that is provided to a house or the like and that does not vary in connection position to the power grid, it is likely to fail in accurate calculation of the amount of power for supply from the EV to the power grid. Therefore, in the present embodiment, in order to enable accurate calculation of the amount of power for supply from the EV to the power grid, the power calculation apparatus is provided as follows.

Figure 1:
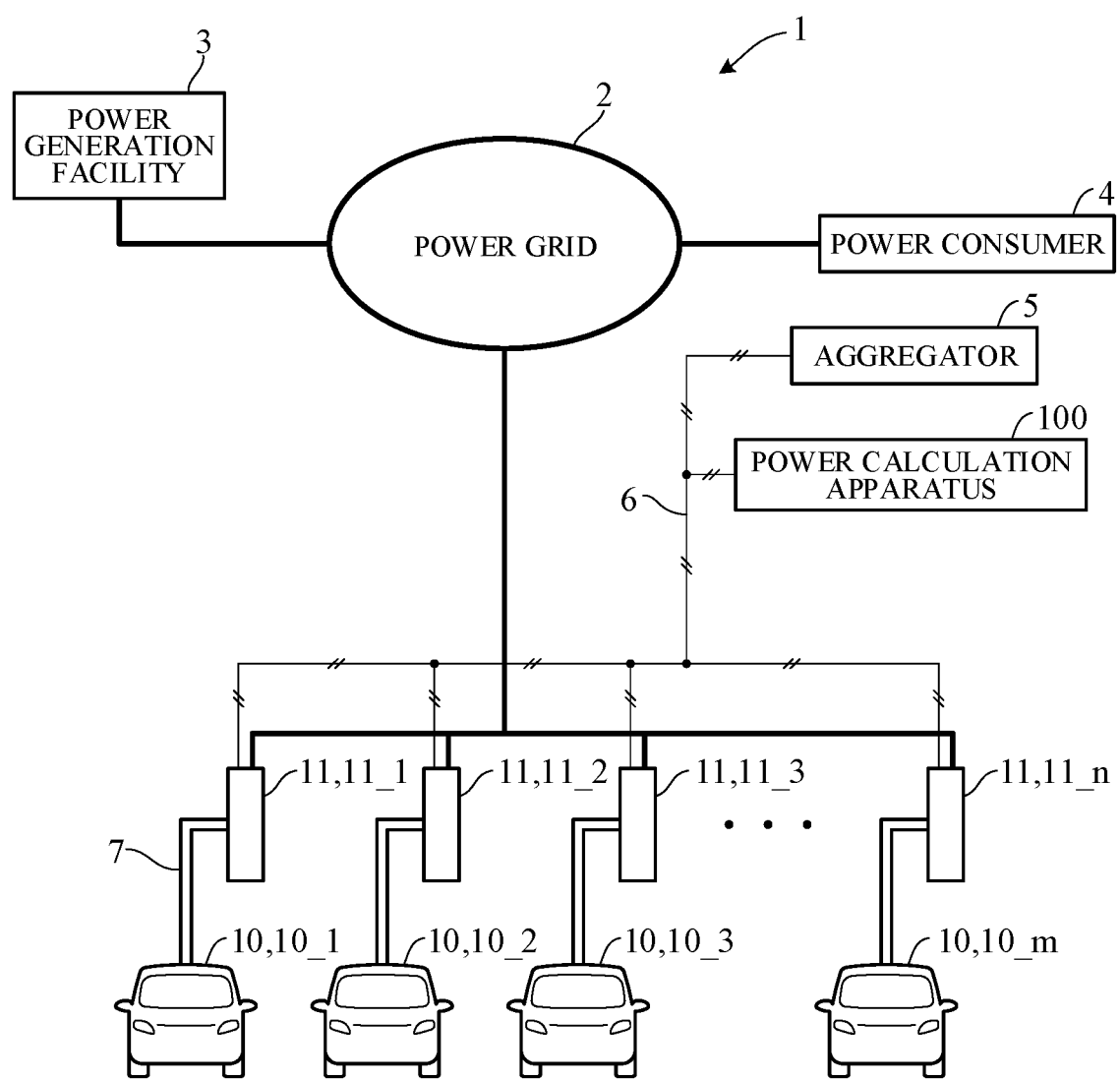
FIG. 1 is a diagram schematically showing a power system to which a power calculation apparatus according to an embodiment of the present invention is applied.

FIG. 1 schematically illustrates a power system including the V2G system to which the power calculation apparatus according to the present embodiment is applied. As illustrated in FIG. 1, a power system 1 to which a power calculation apparatus 100 is applied includes a power grid 2, a power generation facility 3 for supplying generated power to the power grid 2, and a power consumer 4 such as factories or various facilities supplied with power from the power grid 2.

The power system 1 also includes EVs 10_1 to 10_m that each transfer power between the EV 10 and the power grid 2, and pieces of connection apparatus (electric vehicle supply equipment as abbreviated to EVSE) 11_1 to 11_n each interposed between the power grid 2 and the corresponding EV 10. The power system 1 further includes a server device (hereinafter, referred to as an aggregator) 5 for centrally managing power for input and output between the power grid 2 and each EV 10.

The power calculation apparatus 100 is disposed between the pieces of EVSE 11 and the aggregator 5. As illustrated in FIG. 1, the power calculation apparatus 100, each piece of EVSE 11, and the aggregator 5 are connected via a wired or wireless communication network 6 and are communicable with each other.

Each piece of EVSE 11 and the corresponding EV 10 can be connected by a charging cable 7. Each piece of EVSE 11 and the corresponding EV 10 are capable of power transfer therebetween via the charging cable 7. In the present embodiment, each piece of EVSE 11 supplies power supplied from the power grid 2 to the corresponding EV 10 to charge the battery mounted on the EV 10. Each piece of EVSE 11 also supplies power from the corresponding EV 10 to the power grid 2 to make the battery mounted on the EV 10 function as one of the power storage facilities in the power grid 2.

The aggregator 5 performs a bid for the power stored in the battery of an EV 10 to the power transaction market. The power transaction in the power transaction market is performed at each predetermined period, such as season, day of the week, or time zone. Thus, in order for the aggregator 5 to determine whether or not a bid for the power stored in the battery of the EV 10 can be made, it is necessary to predict accurately the amount of power suppliable by the EV 10 in the future (at the next bid) (hereinafter, referred to as the amount of suppliable power).

The EV 10, however, is disconnected or moved from the power grid 2 by the user. Thus, in order to predict the amount of suppliable power of the EV 10 in the future, it is necessary to determine the position of the EV 10 in the future and the likelihood of connection of the EV 10 to a piece of EVSE 11 at the position.

Therefore, the power calculation apparatus 100 according to the present embodiment calculates the amount of suppliable power of the EV 10 in consideration of the position of the EV 10 in the future and the likelihood of connection of the EV 10 to the piece of EVSE 11 at the position.

Figure 2:
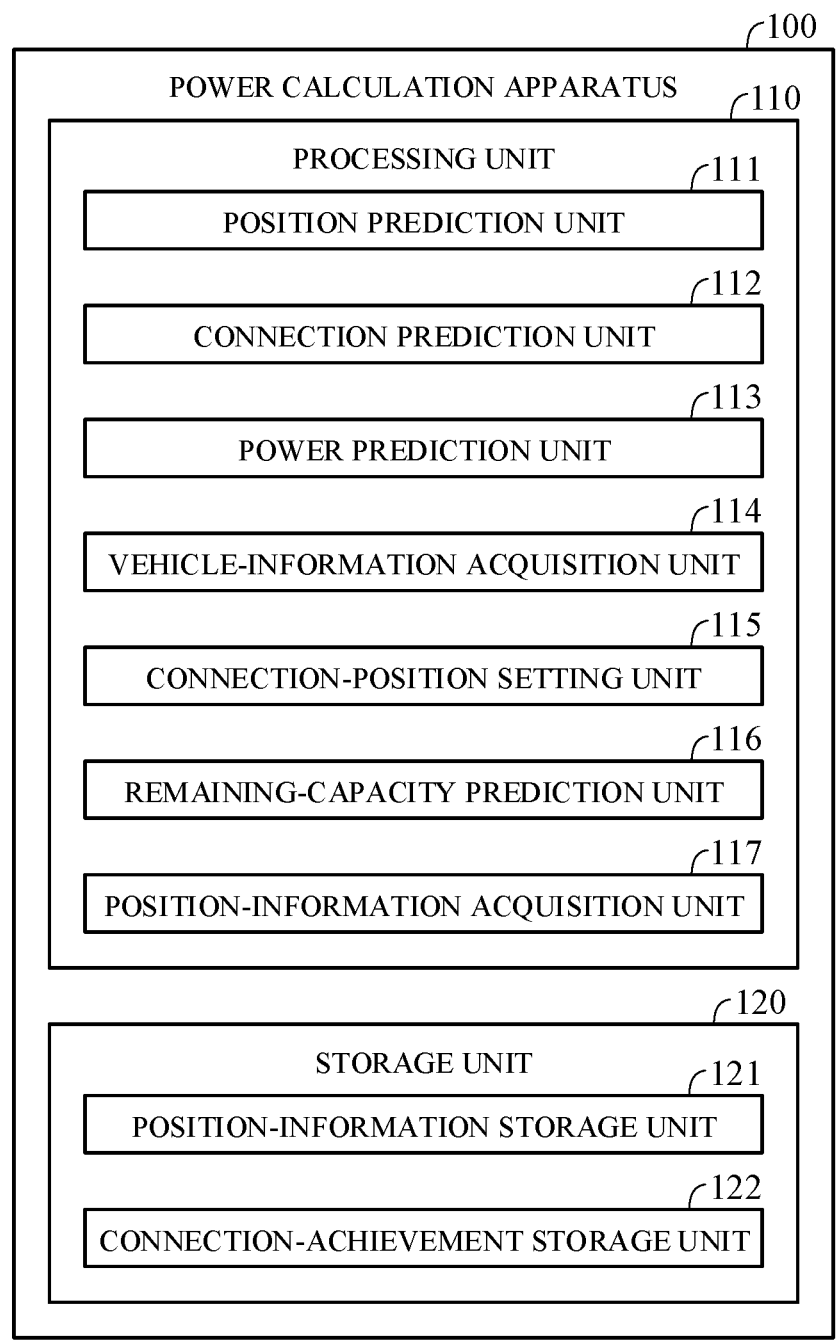
FIG. 2 is a diagram showing an exemplary functional configuration of the power calculation apparatus according to an embodiment of the present invention t.

First, the configuration of the power calculation apparatus 100 according to the present embodiment will be described. FIG. 2 is a diagram illustrating an exemplary functional configuration of the power calculation apparatus 100. As illustrated in FIG. 2, the power calculation apparatus 100 includes a processing unit 110 such as a central processing unit (CPU) (microprocessor), read only memory (ROM), random access memory (RAM), and a memory (storage unit) 120 such as a hard disk. The processing unit 110 executes a program stored in the storage unit 120 to function as a position prediction unit 111, a connection prediction unit 112, a power prediction unit 113, a vehicle-information acquisition unit 114, a connection-position setting unit 115, a remaining-capacity prediction unit 116, and a position-information acquisition unit 117. The storage unit 120 includes a position-information storage unit 121 and a connection-achievement storage unit 122.

The position prediction unit 111 predicts the position of an EV 10 after a predetermined duration. The connection prediction unit 112 predicts the degree of likelihood of connection of the EV 10 to a piece of EVSE 11 after the predetermined duration, based on the position of the EV 10 after the predetermined duration predicted by the position prediction unit 111 and the position of the piece of EVSE 11.

In the present embodiment, when the position of an EV 10 after a predetermined duration predicted by the position prediction unit 111 is within a predetermined distance from the position of any piece of EVSE 11, the connection prediction unit 112 determines that the likelihood of connection of the EV 10 to the piece of EVSE 11 after the predetermined duration is equal to or more than a predetermined degree. In the present embodiment, the likelihood of connection equal to or more than a predetermined degree means that the probability that the user of the EV 10 connects the EV 10 to the piece of EVSE 11 is 50% or higher. Note that the reference of the predetermined degree is not limited to the above. In addition, "the likelihood of connection is equal to or more than a predetermined degree" is sometimes expressed as "having the likelihood of connection".

The power prediction unit 113 predicts, based on the degree of likelihood predicted by the connection prediction unit 112, the amount of power suppliable from the EV 10 to the power grid 2 after the predetermined duration.

The vehicle-information acquisition unit 114 acquires vehicle information from the EV 10. The vehicle-information acquisition unit 114 acquires, as the vehicle information, battery-remaining-capacity information indicating the remaining capacity of the battery and vehicle position information indicating the position of the vehicle. The vehicle-information acquisition unit 114 also acquires action plan information indicating an action plan of the vehicle, as the vehicle information. As described above, the vehicle-information acquisition unit 114 also functions as a vehicle-position-information acquisition unit and an action-plan-information acquisition unit. Note that the power calculation apparatus 100 is communicable with the EV 10 via a wireless communication network (not illustrated) and the vehicle-information acquisition unit 114 acquires the vehicle information from the EV 10 via the wireless communication network. In the present embodiment, it is assumed that the vehicle-information acquisition unit 114 acquires the vehicle information from each of the EVs 10 at a predetermined cycle.

Note that from the action plan information acquired by the vehicle-information acquisition unit 114, the connection prediction unit 112 may determine whether or not each of the EVs 10 is at a predetermined location after the predetermined duration and may determine the stop duration of each of the EVs 10 at the predetermined location. The connection prediction unit 112 may predict the degree of likelihood of connection to a piece of EVSE 11 after the predetermined duration, higher as a vehicle has a longer stop duration at the predetermined location. The predetermined location is a place or facility where a piece of EVSE is highly likely to be provided, for example, a shopping mall. Note that in a case where it is determined that after the predetermined duration, a vehicle is within the site where it is certain that the piece of EVSE is provided, and in a case where it is determined that the vehicle is stopped within the site for a certain duration (for example, 30 minutes) or longer, the connection prediction unit 112 may determine that the likelihood of connection of the vehicle to the piece of EVSE 11 after the predetermined duration is equal to or more than a predetermined degree.

Based on the battery-remaining-capacity information and the vehicle position information acquired by the vehicle-information acquisition unit 114, the connection-position setting unit 115 sets the position of a new piece of EVSE 11 for power supply from the EV 10 to the power grid 2. The procedures for setting the position of the new piece of EVSE 11 will be described below.

The remaining-capacity prediction unit 116 predicts the remaining capacity after the predetermined duration of the battery mounted on the EV 10 determined by the connection prediction unit 112 as having the likelihood of connection to the piece of EVSE 11 after the predetermined duration, equal to or more than the predetermined degree.

The position-information acquisition unit 117 acquires the position information of the piece of EVSE 11 from the position-information storage unit 121. Note that the position-information acquisition unit 117 may acquire the position information of the piece of EVSE 11 via the communication network 6 from the piece of EVSE 11.

The position-information storage unit 121 stores in advance the position information of the piece of EVSE 11. FIG. 3 illustrates exemplary position information. As illustrated in FIG. 3, the position information indicates the position of a piece of EVSE 11. In the example illustrated in FIG. 3, the position of the piece of EVSE 11 is represented by latitude and longitude; however, the position of the piece of EVSE 11 may be represented by other parameters. In the case of setting the position of the new piece of EVSE 11 for power supply from the EV 10 to the power grid 2, the connection-position setting unit 115 adds the newly set position, to the position information. The (n+1)th position information illustrated in FIG. 3 indicates the position information newly added by the connection-position setting unit 115.

The procedure for setting the position of the new piece of EVSE 11 will now be described. The connection-position setting unit 115 specifies an EV 10 that is stopped among the EVs 10_1 to 10_m, from the vehicle position information of the EVs 10_1 to 10_m acquired by the vehicle-information acquisition unit 114 at the predetermined cycle.

The connection-position setting unit 115 further monitors the remaining capacity information of the battery of the specified EV 10, which is acquired by the vehicle-information acquisition unit 114 at a predetermined cycle, while the specified EV 10 is stopped.

Then, in response to an increase in the remaining capacity of the battery of the specified EV 10 by equal to or more than a predetermined amount within a predetermined period, the connection-position setting unit 115 adds information indicating the stop position of the specified EV 10 into the position-information storage unit 121, as new position information. Thus, the position of the new piece of EVSE 11 is set.

Note that the connection-position setting unit 115 may specify an EV 10 that is stopped, based on information different from the vehicle position information. For example, from information indicating the vehicle speed included in the vehicle information of the EVs 10_1 to 10_m, an EV 10 at the speed is 0 km/h may be specified as the EV 10 that is stopped.

The connection-achievement storage unit 122 stores connection-achievement information indicating the achievement of whether or not the user of the EV 10 that is determined as having the likelihood of connection to the piece of EVSE 11 after the predetermined duration, equal to or more than the predetermined degree, has connected the EV 10 to the piece of EVSE 11 after the predetermined duration.

FIG. 4 illustrates exemplary connection-achievement information. The connection-achievement information is information in which the identification information (User ID) of the user and the connection achievement are stored in association with each other. As illustrated in FIG. 4, the connection achievement is represented by the ratio of the number of times of prediction in the past that the likelihood of connection to a piece of EVSE 11 is equal to or more than a predetermined degree to the number of times of connection achievement to a power grid. Note that the way of expressing the connection achievement may be other than the above.

In a case where the connection-achievement information is stored in the connection-achievement storage unit 122, the connection prediction unit 112 predicts the degree of likelihood of connection of the EV 10 to the piece of EVSE 11 after the predetermined duration, in consideration of the connection achievement indicated by the connection-achievement information. For example, the connection prediction unit 112 may multiply the value of the connection achievement illustrated in FIG. 4 by the degree of likelihood predicted based on the position of the EV 10 after the predetermined duration and the position of the EVSE 11 to predict the final degree of likelihood. Thus, in a case where the position of an EV 10 after a predetermined duration is predicted to be within a predetermined distance from the position of any piece of EVSE 11, typically, it is not determined that the degree of likelihood is equal to or more than a predetermined degree regardless of the connection achievement, so that the degree of likelihood can be determined more accurately.

For example, the connection prediction unit 112 specifies the user who is driving the EV 10 from the user ID included in the vehicle information acquired by the vehicle-information acquisition unit 114, and determines the connection achievement of the user from the connection-achievement information in the connection-achievement storage unit 122. Then, the connection prediction unit 112 predicts the degree of likelihood of connection of the EV 10 driven by the user to the piece of EVSE 11 after the predetermined duration, higher as the value of the connection achievement is larger. The connection prediction unit 112 may also predict the degree of likelihood of connection of the EV 10 to the piece of EVSE 11 after the predetermined duration, based on the degree of a reward given to the user of the EV 10 in response to the connection of the EV 10 to the power grid 2.

For example, in a case where the user of the EV 10 has performed a connection preregistration for indicating that the user of the EV 10 operates the operation unit of the EV 10 to connect the EV 10 to the piece of EVSE 11 after a predetermined duration, it is assumed that the reward for the user of the EV 10 is set higher than that of the user who has not performed a connection preregistration. In the case, to the EV 10 with the connection preregistration, the connection prediction unit 112 predicts the degree of likelihood of connection to the piece of EVSE 11 after the predetermined duration, higher, in comparison with the EV 10 with no connection preregistration.

Note that in a case where the user has performed a connection preregistration, it is assumed that the registration information is transmitted from the EV 10 to the power calculation apparatus 100 via the wireless communication network and stored in the storage unit 120. Then, the connection prediction unit 112 refers to the registration information stored in the storage unit 120, and determines whether or not the user of the EV 10 has performed the connection preregistration.

In addition, connection-achievement-post-preregistration information indicating whether or not the user having performed the connection preregistration has connected the EV 10 to the piece of EVSE 11 after the predetermined duration may be stored in the storage unit 120. The connection prediction unit 112 may predict the degree of likelihood of connection to the piece of EVSE 11 after the predetermined duration in accordance with the connection achievement indicated by the connection-achievement-post-preregistration information. For example, the connection prediction unit 112 may predict the degree of the likelihood of connection to the piece of EVSE 11 lower as the number of times of non-connection of the EV 10 to the piece of EVSE 11 after the predetermined duration is larger in spite of having performed the connection preregistration.

Figure 5:
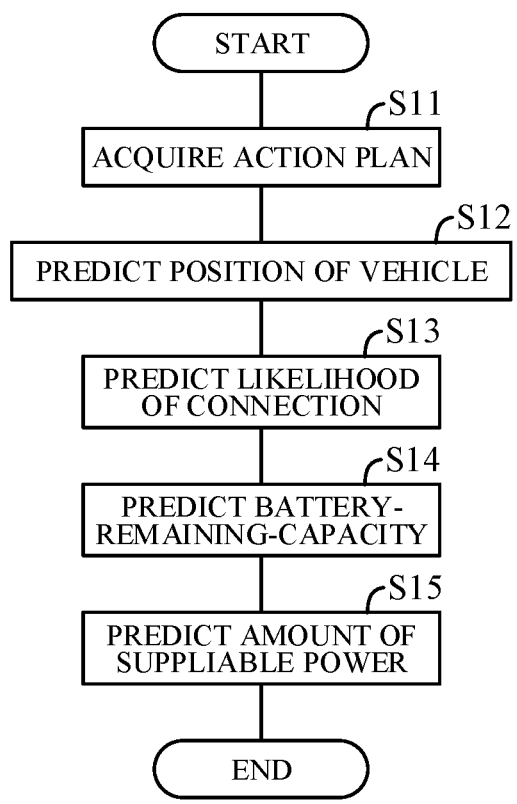
FIG. 5 is a flowchart illustrating an exemplary operation of the power calculation apparatus according to an embodiment of the present invention.

Next, the operation of the power calculation apparatus 100 according to the present embodiment will be described. FIG. 5 is a flowchart illustrating an exemplary operation of the power calculation apparatus 100. It is assumed that the processing illustrating in FIG. 5 performed in response to the timing (the above predetermined cycle) at which the power calculation apparatus 100 acquires vehicle information from an EV 10. Note that the processing illustrated in FIG. 5 may be performed at another timing. For example, the processing may be performed at a predetermined duration before the next bid.

First, in Step S11, the vehicle-information acquisition unit 114 acquires action plan information from each of the EVs 10_1 to 10_m. Next, in Step S12, the position prediction unit 111 predicts the respective positions of the EVs 10_1 to 10_m after a predetermined duration, from the action plan information acquired by the vehicle-information acquisition unit 114.

Next, in Step S13, the connection prediction unit 112 determines whether or not the positions of the EVs 10_1 to 10_m after the predetermined duration predicted by the position prediction unit 111 is within a predetermined distance from any position of the pieces of EVSE 11_1 to 11_n. Then, the connection prediction unit 112 determines that an EV 10 within the predetermined distance from any position of the pieces of EVSE 11_1 to 11_n is the vehicle for which it is predicted that the likelihood of connection to a piece of EVSE 11 after the predetermined duration is equal to or more than a predetermined degree.

Figure 6:
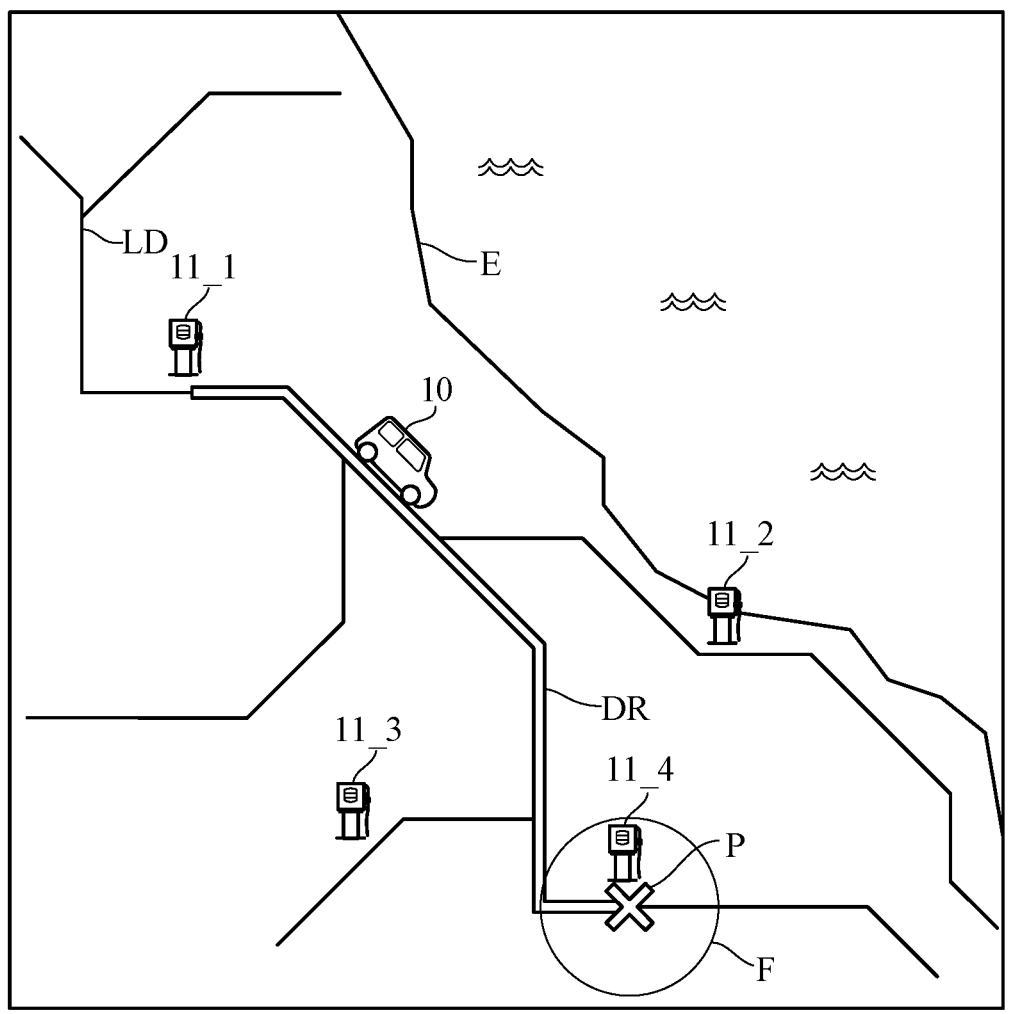
FIG. 6 is a diagram explanatorily showing likelihood of connection of a vehicle to a connection apparatus.

The likelihood of connection of an EV 10 to a piece of EVSE 11 will now be described. FIG. 6 explanatorily illustrates the likelihood of connection of the EV 10 to the piece of EVSE 11.

FIG. 6 illustrates that the EV 10 is traveling on the road LD. The thick line DR in FIG. 6 indicates a travel route based on the action plan information acquired from the EV 10 by the vehicle-information acquisition unit 114. The position P indicates the position of the EV 10 after a predetermined duration, specified from the action plan information. The area F indicates an area within a predetermined distance from the position P of the EV 10 after the predetermined duration. Note that the boundary E indicates a boundary between sea and land.

In a case where a piece of EVSE 11 is present in the area F, the connection prediction unit 112 determines that the likelihood of connection of the EV 10 to the piece of EVSE 11 via the piece of EVSE 11 after the predetermined duration is equal to or more than a predetermined degree. In the example illustrates in FIG. 6, the piece of EVSE 11_4 is within in the area F, and thus it is determined that the likelihood of connection of the EV 10 to the piece of EVSE 11_4 after the predetermined duration is equal to or more than the predetermined degree.

Next, in Step S14, the vehicle-information acquisition unit 114 acquires the battery-remaining-capacity information from the EV 10 determined by the connection prediction unit 112 as having the likelihood of connection to the piece of EVSE 11, equal to or more than the predetermined degree. In a case where there is a plurality of EVs 10 each determined by the connection prediction unit 112 as having the likelihood of connection to a piece of EVSE 11, equal to or more than the predetermined degree, the vehicle-information acquisition unit 114 acquires the battery-remaining-capacity information from each of the plurality of EVs 10.

Then, based on the battery-remaining-capacity information acquired by the vehicle-information acquisition unit 114, the remaining-capacity prediction unit 116 predicts the battery remaining capacity of the EV 10 determined by the connection prediction unit 112 as having the likelihood of connection to the piece of EVSE 11 after the predetermined duration, equal to or more than the predetermined degree. In a case where there is a plurality of EVs 10 each determined by the connection prediction unit 112 as having the likelihood of connection to a piece of EVSE 11, equal to or more than the predetermined degree, the remaining-capacity prediction unit 116 predicts the respective battery remaining capacities of the plurality of EVs 10 after the predetermined duration.

Here, the EV 10 subjected to the processing in Step S14 is determined in accordance with the presence or absence of the likelihood of connection to the piece of EVSE 11. The EV 10 as the processing target in Step S14 may be determined in accordance with the presence or absence of the degree of the likelihood of connection to the piece of EVSE 11.

Figure 7:
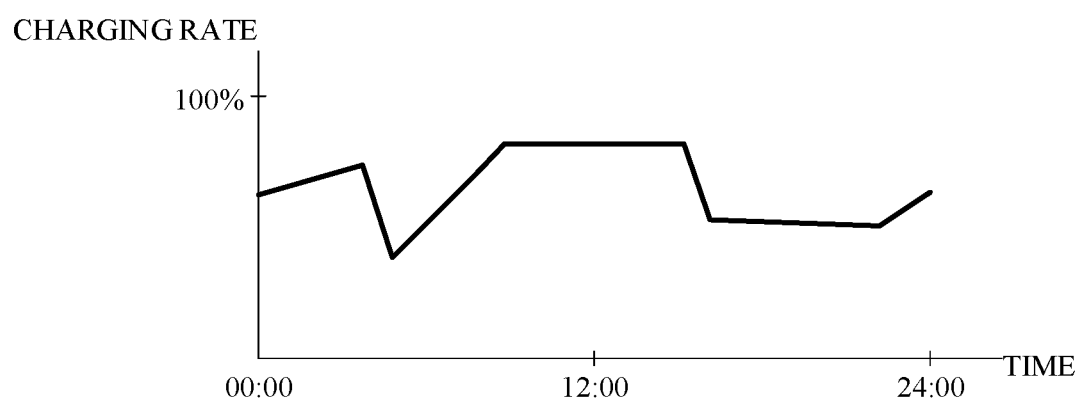
FIG. 7 is a graph showing exemplary battery-remaining-capacity information.

The battery-remaining-capacity information will now be described. FIG. 7 is a graph illustrating exemplary battery-remaining-capacity information. The battery-remaining-capacity information is information in which the battery remaining capacity of each EV 10 in each time zone is recorded, for example, information in which the mean value of the battery remaining capacities in the past predetermined period (for example, past one week or past one month) is recorded for each time zone. Note that in the example illustrated in FIG. 7, the battery remaining capacity is represented by the charging rate; however, the battery remaining capacity may be represented by another parameter.

The remaining-capacity prediction unit 116 acquires, as a prediction value, the battery remaining capacity after a predetermined duration from the present, from the battery-remaining-capacity information. For example, when the present time is 12:00 and the predetermined duration is 30 minutes, the remaining-capacity prediction unit 116 acquires the battery remaining capacity at 12:30 from the battery-remaining-capacity information. Note that the method of predicting the battery remaining capacity after a predetermined duration is not limited to the above, and thus another method may be used. Finally, in Step S15, the power prediction unit 113 predicts, based on the prediction result of the connection prediction unit 112, the amount of power for supply from the EV 10 to the power grid 2, that is, the amount of suppliable power of the EV 10 after the predetermined duration.

A method of predicting the amount of suppliable power of the EV 10 will now be described. In the present embodiment, the power prediction unit 113 acquires, from the remaining-capacity prediction unit 116, the battery remaining capacity after the predetermined duration of the EV 10 determined by the connection prediction unit 112 as having the likelihood of connection to the power grid 2 after the predetermined duration, equal to or more than the predetermined degree. Then, the power prediction unit 113 predicts the acquired battery remaining capacity as the amount of suppliable power of the EV 10 after the predetermined duration.

Note that in a case where the connection prediction unit 112 determines that a plurality of EVs 10 is to be connected to the power grid 2 after the predetermined duration, the value acquired by adding together the respective battery remaining capacities of the plurality of EVs 10 after the predetermined duration is predicted as the amount of suppliable power of the EVs 10 after the predetermined duration. Alternatively, another method may be used for predicting the amount of suppliable power.

For example, the power prediction unit 113 may predict the amount of suppliable power of the EVs 10_1 to 10_m after the predetermined duration, based on the mean value of the battery remaining capacities set in proportion to the number of EVs 10 determined as having the likelihood of connection to the power grid 2 after the predetermined duration, equal to or more than the predetermined degree.

According to the embodiment of the present invention, the following functions and effects can be obtained.

(1) A power calculation apparatus 100 that calculates an amount of power for supply from an electric vehicle (EV) 10 as a vehicle having a battery, to a power grid 2 via a piece of electric vehicle supply equipment (EVSE) 11 as a connection apparatus, includes: a position prediction unit 111 configured to predict a position of the EV 10 after a predetermined duration; a connection prediction unit 112 configured to predict a degree of likelihood of connection of the EV 10 to the piece of EVSE 11 after the predetermined duration, based on the position of the EV 10 after the predetermined duration predicted by the position prediction unit 111 and a position of the piece of EVSE 11, and a power prediction unit 113 configured to predict the amount of power suppliable from the EV 10 to the power grid 2 after the predetermined duration, based on the degree of likelihood predicted by the connection prediction unit 112 (FIG. 2).

Thus, the power calculation apparatus 100 calculates the amount of suppliable power of the EV 10 in consideration of the position of the EV 10 in the future and the degree of likelihood of connection of the EV 10 to the piece of EVSE 11 at the position. Therefore, the amount of suppliable power of the EV 10 can be predicted accurately, and thus determination whether or not a bid for the power stored in the battery of the EV 10 can be made. As a result, the EV is allowed to participate in a power transaction.

(2) The connection prediction unit 112 predicts the degree of likelihood of connection of the EV 10 to the piece of EVSE 11 after the predetermined duration in accordance with a relative distance between the position of the EV 10 after the predetermined duration predicted by the position prediction unit 111 and the position of the piece of EVSE 11.

Thus, the degree of likelihood of connection of the EV 10 to the piece of EVSE 11 after the predetermined duration can be predicted accurately.

(3) The power calculation apparatus 100 further includes: a position-information acquisition unit 117 configured to acquire position information of the piece of EVSE 11, in which when the position of the EV 10 after the predetermined duration predicted by the position prediction unit 111 is within a predetermined distance from the position of the piece of EVSE 11 indicated by the position information acquired by the position-information acquisition unit 117, the connection prediction unit 112 determines that the likelihood of connection of the EV 10 to the piece of EVSE 11 after the predetermined duration is equal to or more than a predetermined degree. Thus, the presence or absence of the likelihood of connection of the EV 10 to the piece of EVSE 11 after the predetermined duration can be determined more accurately.

(4) The power calculation apparatus 100 further includes: a position-information storage unit 121 configured to store in advance the position information of the piece of EVSE 11; a vehicle-position-information acquisition unit (vehicle-information acquisition unit) 114 configured to acquire, from the EV 10, remaining capacity information of the battery mounted on the EV 10 and position information of the EV 10; and a connection-position setting unit 115 configured to set a position of a new piece of EVSE 11 for power supply from the EV 10 to the power grid 2, based on the remaining capacity information and the position information acquired by the vehicle-position-information acquisition unit 114. In response to an increase, by equal to or more than a predetermined amount within a predetermined period, in the remaining capacity of the battery of the EV 10 that is determined as being stopped based on the position information of the EV 10, the connection-position setting unit 115 stores a stop position of the EV 10 into the position-information storage unit 121, as the position of the new piece of EVSE 11. Thus, inclusive of a piece of EVSE 11 unregistered in the position-information storage unit 121 and a piece of EVSE 11 provided newly, the degree of likelihood of connection of the EV 10 to the piece of EVSE 11 can be predicted. Therefore, the amount of suppliable power of the EV 10 can be predicted more accurately.

(5) The power calculation apparatus 100 further includes: an action-plan-information acquisition unit (vehicle-information acquisition unit) 114 configured to acquire, from the EV 10, action plan information indicating an action plan of the EV 10. The connection prediction unit 112 determines a stop duration at a predetermined location predicted from the action plan information acquired by the action-plan-information acquisition unit 114, and predicts the degree of likelihood of connection of the EV 10 to the piece of EVSE 11 after the predetermined duration, higher as the stop duration at the predetermined location is longer. Thus, the battery remaining capacity of the EV 10 that is expected to have a longer stop duration in a place or facility such as a shopping mall where the likelihood of provision of a piece of EVSE is higher can be included in the amount of suppliable power to the power grid 2. Therefore, the amounts of power suppliable from EVs 10_1 to 10_m to the power grid 2 can be calculated accurately.

(6) The power calculation apparatus 100 further includes:
a remaining-capacity prediction unit 116 configured to predict the remaining capacity of the battery mounted on the EV 10 after the predetermined duration. The power prediction unit 113 predicts the amount of power suppliable from the EV 10 to the power grid 2 after the predetermined duration, based on the battery remaining capacity after the predetermined duration of the EV 10 predicted by the remaining-capacity prediction unit 116, the EV 10 being determined by the connection prediction unit 112 as having the likelihood of connection to the piece of EVSE 11 after the predetermined duration, equal to or more than the predetermined degree. Thus, based on a prediction value of the battery remaining capacity after the predetermined duration of the EV 10 determined as having the likelihood of connection to the piece of EVSE 11, equal to or more than the predetermined degree, the amount of suppliable power of the EV 10 is calculated. Therefore, the amount of suppliable power of the EV 10 can be calculated more accurately.

(7) The power is supplied from a plurality of the vehicles (EVs 10_1 to 10_m) each having the battery, to the power grid 2 via a plurality of pieces of the connection apparatus (EVSE 11_1 to 11_n), and based on a mean value of respective remaining capacities of the batteries set in proportion to a number of the EVs 10 that are each determined by the connection prediction unit 112 as having the likelihood of connection to the piece of EVSE 11 after the predetermined duration, equal to or more than the predetermined degree, the power prediction unit 113 predicts the amount of power suppliable to the power grid 2 from each of the EVs 10_1 to 10_m after the predetermined duration. Thus, the battery remaining capacity after the predetermined duration of the EV 10 determined as having the likelihood of connection to the piece of EVSE 11, equal to or more than the predetermined degree, can be predicted without performing complicated prediction processing.

(8) The power calculation apparatus 100, further includes: a connection-achievement storage unit 122 configured to store connection-achievement information indicating an achievement of whether or not a user of the EV 10 has connected the EV 10 to the piece of EVSE 11 after the predetermined duration, in a case where the connection prediction unit 112 determines that the likelihood of connection of the EV 10 to the piece of EVSE 11 after the predetermined duration is equal to or more than the predetermined degree. The connection prediction unit 112 further predicts, based on the connection-achievement information stored in the connection-achievement storage unit 122, the degree of likelihood of connection of the EV 10 to the piece of EVSE 11 after the predetermined duration. Thus, the degree of connection of the EV 10 to the piece of EVSE 11 after the predetermined duration can be predicted more accurately.

(9) The connection prediction unit 112 further predicts the degree of likelihood of connection of the EV 10 to the piece of EVSE 11 after the predetermined duration, based on a degree of a reward given to the user of the EV 10 in response to a connection of the EV 10 to the piece of EVSE 11. Thus, in a case where the reward is given to the user who cooperates in power supply to the power grid, the degree of likelihood of connection of the EV 10 to the piece of EVSE 11 can be predicted accurately.

The above embodiment may be modified variously. Such modifications will be described below. There has been exemplified in the above embodiment that the power calculation apparatus 100 is disposed between the pieces of EVSE 11 and the aggregator 5; however, a power calculation apparatus may be included inside an aggregator.

In addition, there has been exemplified in the above embodiment that the connection prediction unit 112 predicts the degree of likelihood of connection of an EV to a piece of EVSE 11 after a predetermined duration, based on the position of the piece of EVSE 11. However, the configuration of a connection prediction unit is not limited to the above. In addition to the position of the piece of EVSE 11, the connection prediction unit may predict the degree of the probability of connection of the EV 10 to the piece of EVSE 11, based on the likelihood of vacancy of the piece of EVSE 11. For example, the connection prediction unit 112 may predict the degree of probability of connection of the EV 10 to the piece of EVSE 11 after the predetermined duration, lower as the likelihood of vacancy of the piece of EVSE 11 after the predetermined duration is lower.

Figure 8:
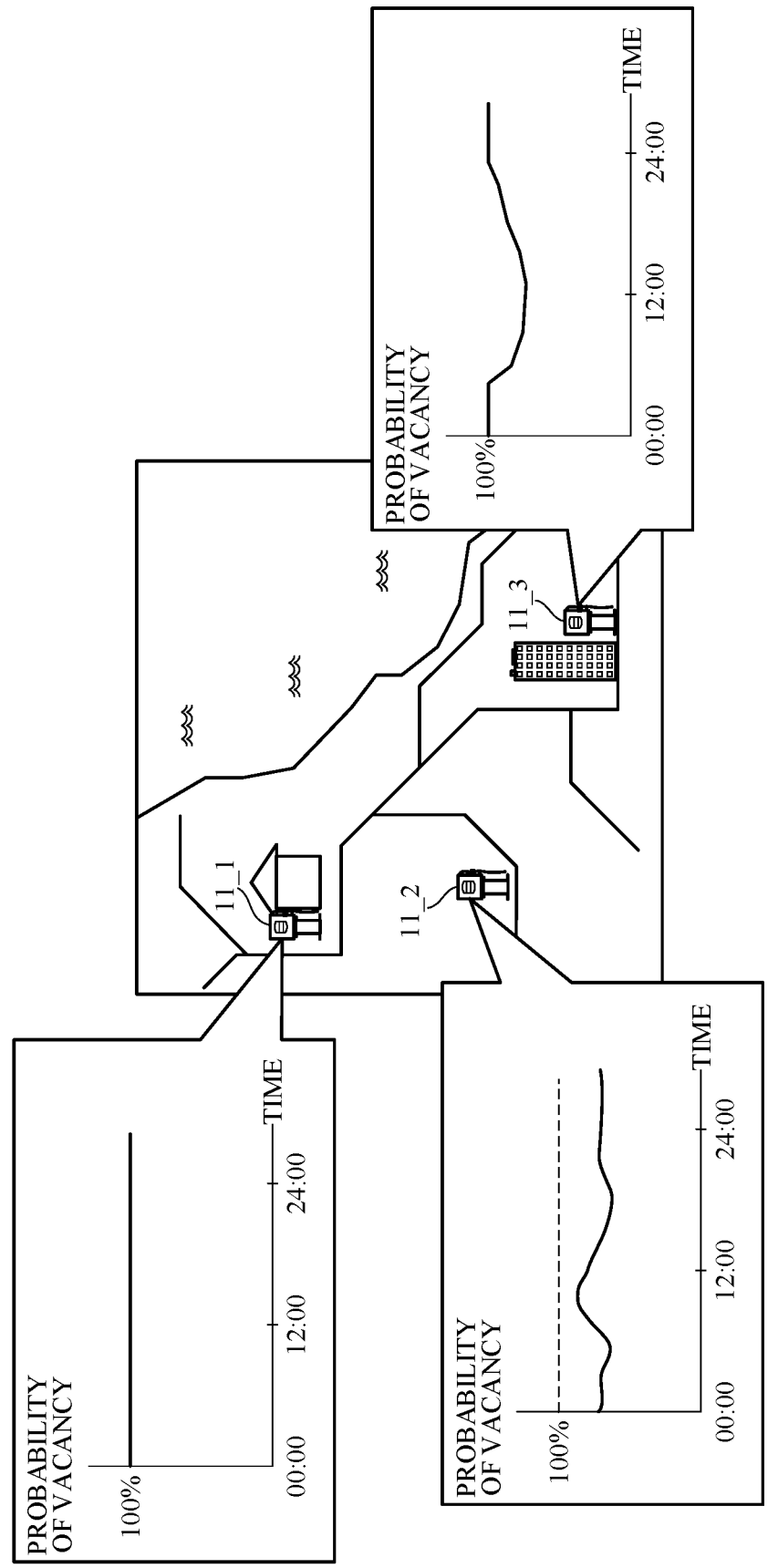
FIG. 8 is a diagram showing a probability of vacancy of connection apparatus.

FIG. 8 explanatorily illustrates the probability of vacancy of a piece of EVSE 11. As illustrated in FIG. 8, it is assumed that the piece of EVSE 11 includes a storage unit (not illustrated) and stores vacancy information indicating the probability of vacancy in the storage unit. The vacancy information is information in which the probability of vacancy in each time zone is recorded, for example, information in which the probability that the piece of EVSE 11 was vacant, that is, not used in the past predetermined period (for example, past one week, past one month) is recorded for each time zone.

In the example illustrated in FIG. 8, the time zone in which the probability of vacancy is 100% is the time zone in which the piece of EVSE 11 was not used at all in the past predetermined period. The time zone in which the probability of vacancy is 90% is the time zone in which the piece of EVSE 11 is in use with a probability of one out of 10 times in the past predetermined period. In addition, in the example illustrated in FIG. 8, the piece of EVSE 11_1 provided to the user's home is not used by another user, and thus the probability of vacancy keeps 100%. On the other hand, the piece of EVSE 11_3 provided to a facility such as a building is used by a plurality of users in the daytime, and thus the probability of vacancy in the daytime is lower.

In addition, there has been exemplified in the above embodiment that one aggregator 5 is provided in the power system 1. However, in a case where a plurality of aggregators is provided in the power system 1 and the aggregators manage one-to-one EV groups different from each other, a power management apparatus may be disposed between each aggregator and the corresponding EV group.

There has been further exemplified in the present embodiment that each EV 10 is in connection with the aggregator 5. An aggregator, however, may be in connection with a fixed battery fixed and provided to a house or the like, such as a battery for storing power by solar power generation. Note that in a case where both such a fixed battery and an EV are in connection with the aggregator, a power calculation apparatus calculates the power of the fixed battery and the power of the EV separately.

The above embodiment can be combined as desired with one or more of the above modifications. The modifications can also be combined with one another.

According to the present invention, the amount of power for supply from a vehicle to a power grid can be predicted accurately.

Above, while the present invention has been described with reference to the preferred embodiments thereof, it will be understood, by those skilled in the art, that various changes and modifications may be made thereto without departing from the scope of the appended claims.

What is claimed is:

1. A power system comprising:
   an aggregator that manages power output from a plurality of vehicles each having a battery, to a power grid; and a power calculation apparatus communicable with the aggregator, the power calculation apparatus comprising:

a microprocessor communicable with a vehicle via a wireless communication network, and a memory connected to the microprocessor, wherein the memory stores position information of a connection apparatus configured to transfer power from the battery of the vehicle to the power grid, and the microprocessor is configured to perform:

acquiring, at a predetermined cycle from the vehicle through the wireless communication network, action plan information of the vehicle including a driving route to a destination and battery-remaining-capacity information on a remaining capacity of the battery, calculating a degree of likelihood of connection of the vehicle to the connection apparatus after a predetermined duration, based on a predicted position of the vehicle after the predetermined duration on the driving route included in the action plan information and the position information of the connection apparatus stored in the memory, calculating the remaining capacity after the predetermined duration based on a temporal transition of the remaining capacity indicated by the battery-remaining-capacity information acquired during a past predetermined period, when the degree of likelihood of connection is equal to or more than a predetermined degree, and calculating a predicted value of an amount of power suppliable from the vehicle to the power grid after the predetermined duration, based on the remaining capacity after the predetermined duration; and the aggregator performs a bid for the power stored in the battery to a power transaction market based on the predicted value of the amount of power suppliable from the vehicle to the power grid in the future.

2. The power system according to claim 1, wherein
the microprocessor is configured to perform
the calculating the degree of likelihood including calculating the degree of likelihood of connection of the vehicle to the connection apparatus after the predetermined duration in accordance with a relative distance between the predicted position of the vehicle after the predetermined duration and a position of the connection apparatus indicated by the position information.

3. The power system according to claim 1, wherein
the microprocessor is configured to perform
the calculating the degree of likelihood including calculating, when the predicted position of the vehicle after the predetermined duration is within a predetermined distance from a position of the connection apparatus indicated by the position information, the degree of likelihood of connection of the vehicle to the connection apparatus after the predetermined duration to be equal to or more than the predetermined degree.

4. The power system according to claim 1, wherein
the microprocessor is configured to perform:
acquiring, at the predetermined cycle from the vehicle through the wireless communication network, position information of the vehicle;
setting a position of a new connection apparatus for power supply from the vehicle to the power grid, when the remaining capacity of the battery of the vehicle increases by equal to or more than a predetermined amount within a predetermined period while the vehicle is determined to be stopped based on the position information; and
storing position information of the new connection apparatus into the memory.

5. The power system according to claim 1, wherein
the microprocessor is configured to perform
the calculating the degree of likelihood including determining a stop duration at a predetermined location based on the action plan information to calculate the degree of likelihood of connection of the vehicle to the connection apparatus after the predetermined duration, higher as the stop duration at the predetermined location is longer.

6. The power system according to claim 1, wherein
the power is supplied from a plurality of vehicles each having the battery, to the power grid via a plurality of pieces of the connection apparatus, and
the microprocessor is configured to perform
the calculating the predicted value including calculating the predicted value of the amount of power suppliable to the power grid from each of the vehicles after the predetermined duration based on a mean value of respective remaining capacities of the batteries set in proportion to a number of the vehicles of which the degree of likelihood of connection to the connection apparatus after the predetermined duration is equal to or more than the predetermined degree.

7. The power system according to claim 1, wherein
the memory is configured to store, when the degree of likelihood of connection of the vehicle to the connection apparatus after the predetermined duration is equal to or more than the predetermined degree, connection-achievement information indicating an achievement regarding whether or not a user of the vehicle has connected the vehicle to the connection apparatus after the predetermined duration, wherein
the microprocessor is configured to perform
the calculating the degree of likelihood including calculating, based on the connection-achievement information stored in the memory, the degree of likelihood of connection of the vehicle to the connection apparatus after the predetermined duration.

8. The power system according to claim 1, wherein
the microprocessor is configured to perform
the calculating the degree of likelihood including calculating the degree of likelihood of connection of the vehicle to the connection apparatus after the predetermined duration based on a degree of a reward given to a user of the vehicle when the vehicle is connected to the connection apparatus.

9. A power calculation method of a power calculation apparatus communicable with an aggregator, the aggregator manages power output from a plurality of vehicles each having a battery, to a power grid, the power calculation method comprising:

storing, in memory, position information of a connection apparatus configured to transfer power from the battery of a vehicle to the power grid, acquiring, at a predetermined cycle from the vehicle through a wireless communication network, action plan information of the vehicle including a driving route to a destination and battery-remaining-capacity information on a remaining capacity of the battery, calculating a degree of likelihood of connection of the vehicle to the connection apparatus after a predetermined duration, based on a predicted position of the vehicle after the predetermined duration on the driving route included in the action plan information and the position information of the connection apparatus stored in the memory, calculating the remaining capacity after the predetermined duration based on a temporal transition of the remaining capacity indicated by the battery-remaining-capacity information acquired during a past predetermined period, when the degree of likelihood of connection is equal to or more than a predetermined degree, calculating a predicted value of an amount of power suppliable from the vehicle to the power grid after the predetermined duration, based on the remaining capacity after the predetermined duration, and performing, at the aggregator, a bid for the power stored in the battery to a power transaction market based on the predicted value of the amount of power suppliable from the vehicle to the power grid in the future.

\* \* \* \* \*